United States Patent
Van Berkel (10) Patent No.: US 6,310,406 B1
(45) Date of Patent: Oct. 30, 2001

(54) MAGNETO HYDRO DYNAMICAL TIDAL AND OCEAN CURRENT CONVERTER

(75) Inventor: Jacob Van Berkel, Rhenen (NL)

(73) Assignee: Entry-Technology, Rhenen (NL)

( * ) Notice: Subject to any disclaimer, the term of this patent is extended or adjusted under 35 U.S.C. 154(b) by 0 days.

(21) Appl. No.: 09/601,071

(22) PCT Filed: Jan. 27, 1999

(86) PCT No.: PCT/NL99/00048

§ 371 Date: Aug. 21, 2000

§ 102(e) Date: Aug. 21, 2000

(87) PCT Pub. No.: WO99/37914

PCT Pub. Date: Jul. 29, 1999

(30) Foreign Application Priority Data

Jan. 27, 1998 (EP) .................................. 98200230

(51) Int. Cl.$^7$ .................................. F03B 13/00
(52) U.S. Cl. .................................. 290/43; 310/11
(58) Field of Search .................................. 290/43, 42, 54, 290/53; 310/11

(56) References Cited

U.S. PATENT DOCUMENTS

| | | | |
|---|---|---|---|
| 4,151,423 | * 4/1979 | Hendel | 290/42 |
| 4,153,757 | * 5/1979 | Clark, III | 429/47 |
| 4,663,932 | * 5/1987 | Cox | 60/200.1 |
| 5,003,517 | * 3/1991 | Greer, Jr. | 367/178 |
| 5,136,173 | 8/1992 | Rynne | 290/53 |
| 5,273,465 | 12/1993 | Meng | 440/6 |
| 5,298,818 | * 3/1994 | Tada | 310/11 |
| 5,314,311 | * 5/1994 | Tada | 417/50 |

FOREIGN PATENT DOCUMENTS 2 255 947    11/1992   (GB) .

\* cited by examiner

Primary Examiner—Joseph Waks
(74) Attorney, Agent, or Firm—Young & Thompson (57) ABSTRACT

A magneto hydrodynamic apparatus and method for generating electrical power comprising: magnetic field generating elements (12, 13;22, 23; 31; 44; 54) for generating a magnetic field (B) within a flowing, conductive fluid like sea water, which magnetic field generating elements have a construction enclosing a construction volume; electrode elements (11, 14, 24; 21, 24, 25; 41; 54) to supply electrical power caused by said flowing, conductive fluid in the magnetic field, wherein the magnetic field generating elements are arranged to produce a substantial portion of the generated magnetic field outside the construction volume.

19 Claims, 8 Drawing Sheets

Tidal current

MAGNETO HYDRO DYNAMICAL TIDAL AND OCEAN CURRENT CONVERTER

1. DESCRIPTION OF THE PRIOR ART

1.1 State of the Art: Tidal & Ocean Current Exploitation

A huge amount of energy is present in the world's tidal and ocean currents. Estimated is an amount of 200,000 MW for ocean tidal and 50,000 MW for ocean currents (Charlier, 1982).

Figure 1:
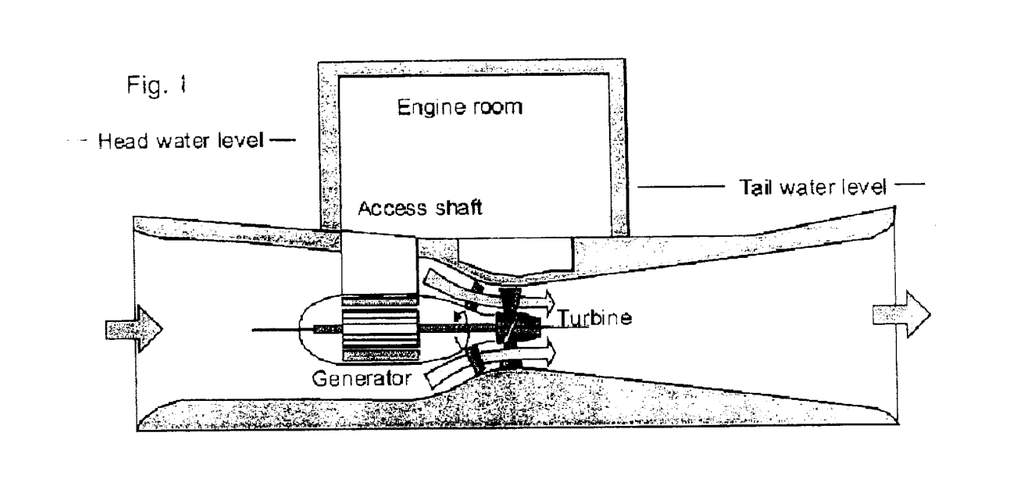
FIG. 1 shows the known in the art scheme utilizing a barrage to block a tidal flow prior to release through a turbine.

However, today this vast amount of energy is hardly exploited. At present only one 250 MW tidal power scheme is in operation, in France in the estuary of the river Rance. The scheme utilises a barrage to block the tidal flow and to release it through propeller turbines, see FIG. 1.

Figure 2:
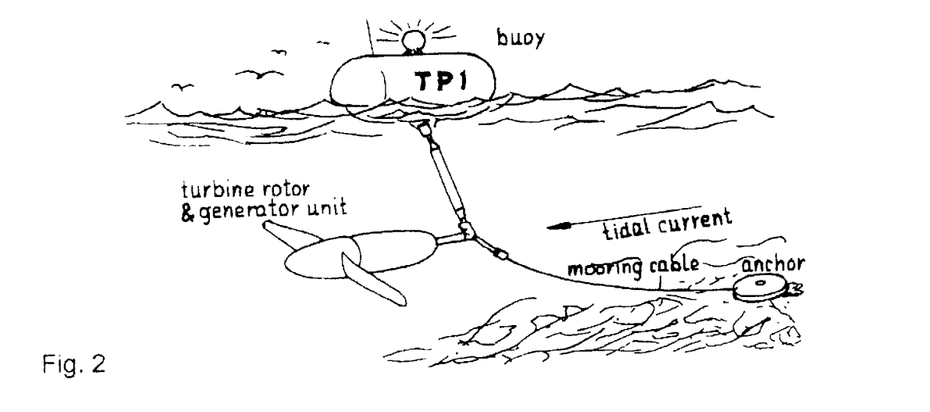
FIG. 2 shows a stream device as known in the art.

Devices which are yet in the test-phase are so-called free stream devices, see FIG. 2 (adapted from IT-power News, 1993). These devices do not need a barrage but directly convert the kinetic energy of the current into mechanical energy. Their development descend from the windmill turbine technology. However, as yet no free stream device has reached the pilot-state.

Plans for large scale application are now being developed, like the Cenex (Current Energy Exploitation) plan to harness energy from the strait of Messina. The first phase of this project foresees in the installation of about 100 Darieus-type turbines.

1.2 Drawbacks

Both the barrage and the free stream devices have their specific drawbacks. The barrage systems involve large scale civil engineering works (the barrage itself). Apart from the large capital needs for the construction, these systems have a large environmental impact during construction, but also during operation. With respect to the free stream devices, it can be stated that their environmental impact is less. However, as the mechanical energy is not densified before conversion (like in the barrage type through blocking of the flow) the amount of energy converted per turbine is less. In addition, as these turbines have to operate in a hazardous marine environment, the turbines (involving numerous moving parts) are prone to corrosion and mechanical failure. As they are less easily accessible, maintenance of the underwater mechanical engineering works (rotor blades, seals, gear box, generator) is costly and time consuming.

1.3 Historic Background

The first person who became aware of the interaction between an electric and a magnetic field is Michael Faraday. As part of his experiments, he tried to measure an electrical potential, generated by the tidal flow passing Waterloo's bridge in the earth's magnetic field (Faraday, 1839). However, possibly due to the low magnetic field strength (at 52 Deg. latitude (Holland/UK), the horizontal component of the earth magnetic field amounts to $1.8 \cdot 10^{-5}$ Tesla) Faraday was not able to detect a potential difference.

U.S. Pat. No. 6,136,173 discloses a magneto hydrodynamic generator. The generator comprises a float attached to suspension means. At the other side of the suspension means, magnetohydrodynamic conversion means are connected for suspending on the float at a deep level in the sea. In us, the float is going up and down due to movement of the sea at its surface and, thus, the conversion means are moving up and down below the sea surface. Sea water is forced to flow through an outward flared opening passageway into a working volume of the converter means. Electrodes are provided within this working volume. In use, the conversion means produce a magnetic field, at least within the working volume, and an electric field will be produced between the electrodes due to the magnetic field within this working volume and the sea water flowing within this working volume. Electrical power may be taken from these electrodes.

The principle to generate electricity by moving a conductor in a magnetic field is nowadays utilised in electricity generators (dynamo-principle). Normally the electrical conductor is a copper (or aluminium) wire. In the thirties of this century systems were developed in which the conductor itself was a fluid. Specifically systems have been studied in which the conductor is a high temperature (electricity conducting) ionised gas (a plasma). The systems are intended to be used as a topping (high temperature) cycle of traditional fossil fuel plants. MHD conversion gained considerable attention in the sixties and seventies. However, the development of combined (gas and steam turbine) cycles (in which gas turbines are used as top cycles) and the decline of interest in nuclear power caused a decline in the interest in MHD conversion.

An MHD-application which is also relevant to the present invention is MHD ship and submarine propulsion. By creating an electric-magnetic field around a ship's hull, body forces are exerted on the conductive water surrounding the vessel. As a reaction the ship is propelled. As fluid body forces (unlike surface forces) may be exerted over a large distance, a large area may be swept, creating the necessary amount of impulse with a minimum amount of kinetic energy (which represents the loss). Goal was to build large (100,000 tons) cargo submarines. However, the low efficiency of the MHD propulsion system (mainly caused by the limited conductivity of the sea water and the high power consumption of the super conduction magnets) led to abandonment of the principle (Philips, 1962).

BRIEF SUMMARY OF INVENTION

1.4 Summary of the Invention

The present invention aims to directly convert the power of flowing conductive liquids, like saline waters into electrical power (without a mechanical energy transition step). The working principle is based on the interaction between an electrical field, a magnetical field and a hydro-dynamical field, see FIG. 3. When an electrical conductor moves in a direction 1 through a magnetic field B in a direction 2, an electrical field E in a direction 3 is created.

Therefore the invention claims a magneto hydrodynamic apparatus as claimed in claim 1.

Figure 3:
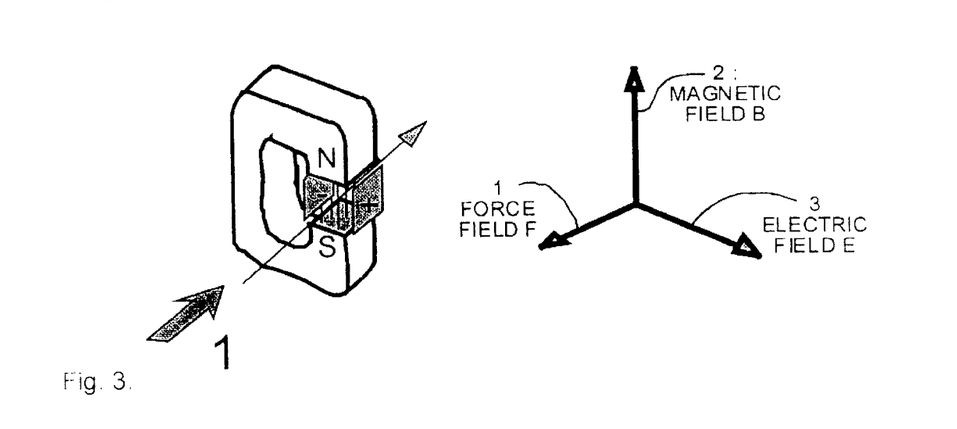
FIG. 3 represents the working principle based on interaction between electrical magnetic and hydrodynamic fields applied in the disclosed system.

Whereas in known MHD converters the magnetic field lines are substantially within the construction volume itself, like between the magnetic poles shown in FIG. 3, the invention is based on the insight that magnetic field lines can be generated largely outside the construction volume, which is a great advantage when the converter is immersed in the flowing liquid like sea water. The converter itself can be made small while still converting energy from large amounts of flowing liquid into electricity.

As magneto hydrodynamic (MHD) forces are body forces (acting on fluid bodies, on a distance) and not surface forces (acting only on fluid surfaces in direct contact with the converter), volumes much larger than the converter itself may take part in the power conversion process. Furthermore, the conversion process works without moving, mechanical engineering components, which simplifies the maintenance. In addition, the absence of moving parts makes the canvasser more robust and reliable.

In this invention, MHD tidal and ocean current converter types are discerned with respect to the magnetic field actuation and augmentation principle.

The present invention will be explained in detail with reference to some drawings.

BRIEF DESCRIPTION OF DRAWINGS

1.4.1 Magnetic field actuation by permanent magnets.

1.4.2 Direct current magnetic field actuation.

1.4.3 Alternating current magnetic field actuation.

1.4.4 Systems using kinetic energy augmentation.

DETAILED DESCRIPTION

2 MHD Tidal and Ocean Current Converter (Basic Layout)

2.1 Permanent Magnet Systems

Figure 4:
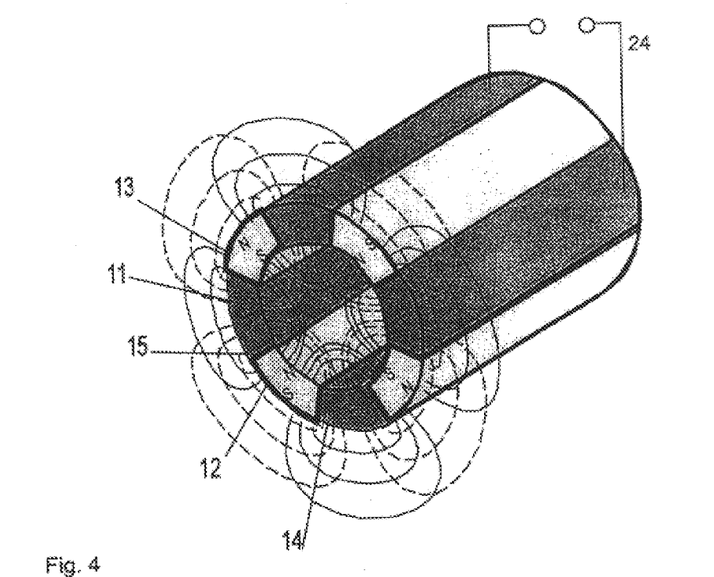
In FIG. 4, a multi-polar permanent magnet converter is shown.

A permanent magnet system can be configured in mono- or multi-polar form, see FIG. 4. In multi-polar form it consists of segmented bar magnets 12, 13, which are combined staggered-wise with segmented positive and negative electrodes 11 and 14. To eliminate short circuiting along the magnet surfaces, the magnets are electrically insulated with an insulation (PTFE) sheet 15. Shown are the magnet North and South poles and the magnetic field lines (solid lines) and the electrical potential field (dashed lines). In this configuration, an electrical current starts to flow, orthogonally to the magnetic field lines, from one electrode to the other. This current represents the generated electrical power. The electrical current may be brought to the outside world by electrical power leads 24, two of which being shown in FIG. 4.

2.2 Open Direct Current Systems

Figure 5:
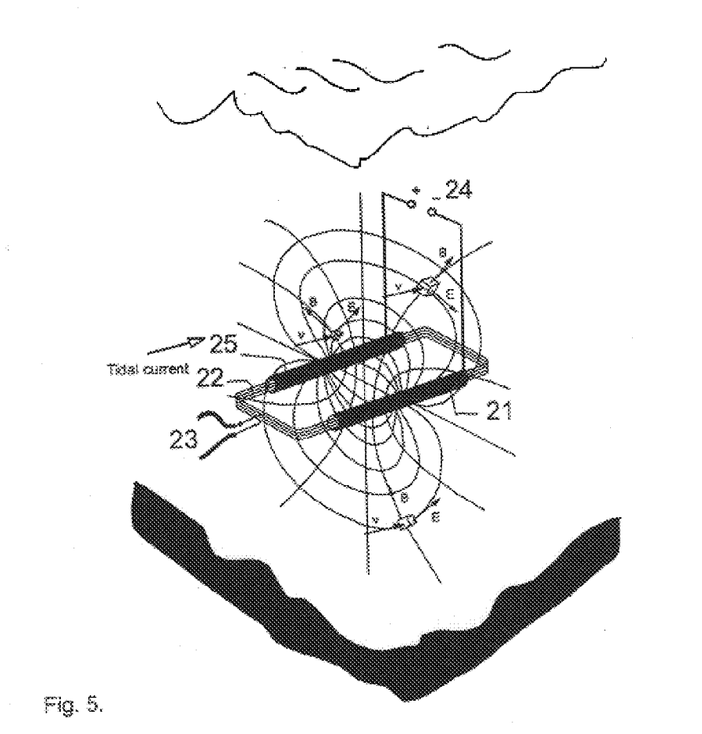
In FIG. 5, a dipolar direct current converter is shown in perspective view.

The magnetic field strength can be enhanced by virtue of electrical actuation. The di-polar DC-variant is shown in FIG. 5. The converter consists of a rectangular electrical conductor coil 22 with the longer axis aligned with the fluid flow, e.g. due to tidal flow. Two tubular electrodes 21,25 enclose the electrical conductor but are insulated electrically and thermally from the conductor 22. To facilitate thermal- and electrical insulation, the coil 22 is isolated from the ambient by a tubular casing (not shown in FIG. 5). The annulus between the enclosing tubes 21 and the electrical conductor 22 can be made vacuum as to enable cryogenic cooling and superconduction of the electrical conductor 22. Power leads 23 supply the necessary power for the magnet system.

Due to an electrical current flowing in the rectangular conductor 22 a magnetic field B is created, as indicated by the solid lines. Due to interaction with the fluid motion, an electrical current starts to flow from one electrode to the other. The electrical current is brought to the outside by electrical power leads 24.

Together with a potential difference imposed over the electrodes, the electrical current represents an amount of electrical power.

Figure 6:
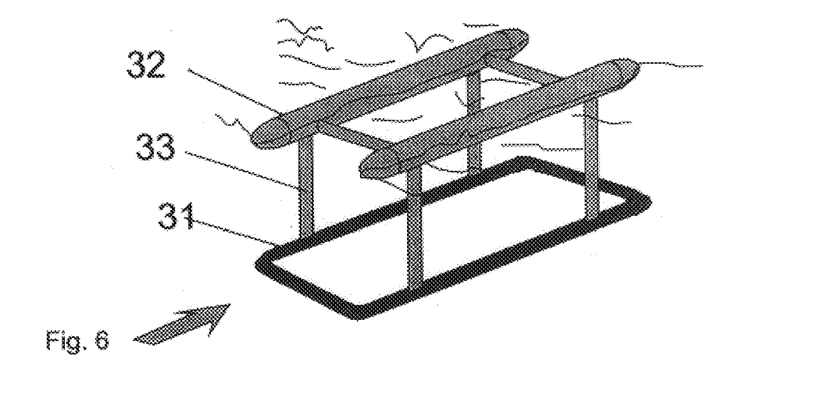
In FIG. 6, a system, comprising the current converter shown in FIG. 5 is shown.

A floating dipolar DC system is shown in FIG. 6. The system consists of a rectangular antenna 31, comprising the arrangement 21,22, 23 as shown in FIG. 5, connected to floaters 32 by means of suspension bars 33.

Figure 7:
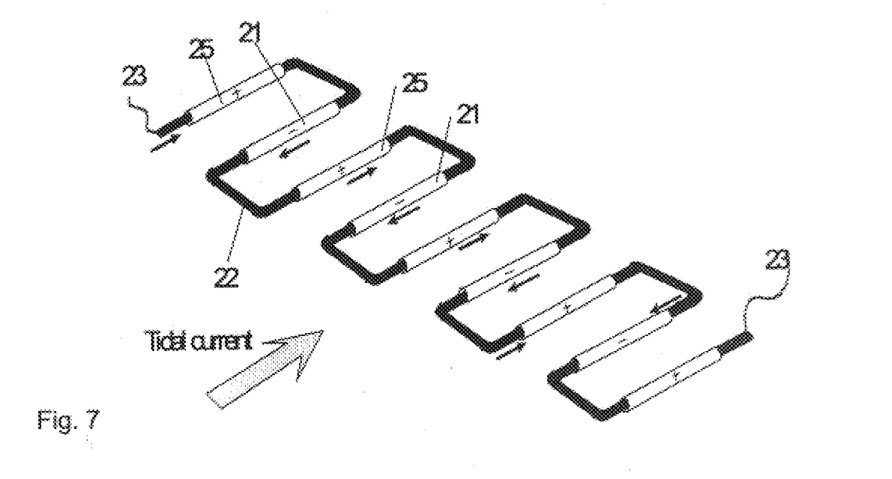
In FIG. 7, a force balanced (serpentine) type of direct current converter is shown.
Figure 8:
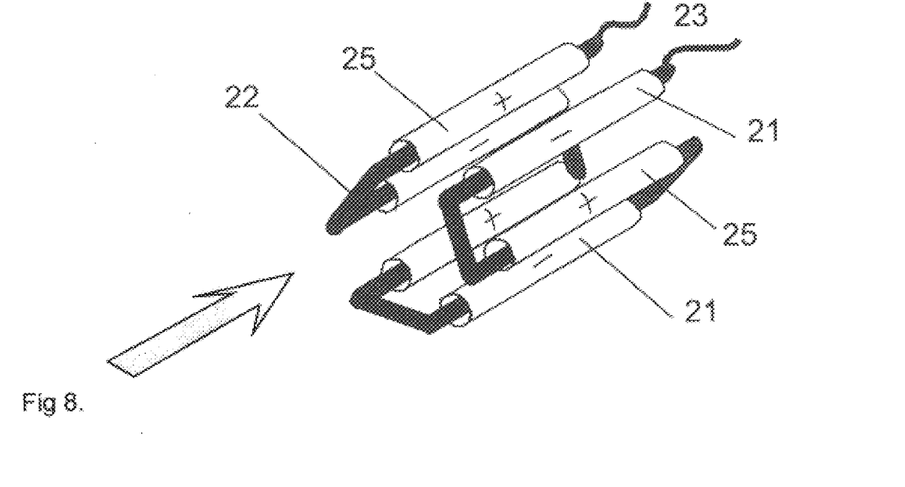
In FIG. 8, a force balanced (squirrel cage) type of direct current converter is shown.

To compensate for magnetic forces acting on the electrical conductors, the conductors can be configured in a periodic manner, as shown in FIG. 7. In this configuration, each conductor has neighbors which counteract the forces exerted by other neighbors. This strategy works perfectly for the serpentine arrangement and (to a large extend) for a multi-polar arrangement shown in FIG. 8.

2.3 Enclosed Direct Current Systems

Figure 9:
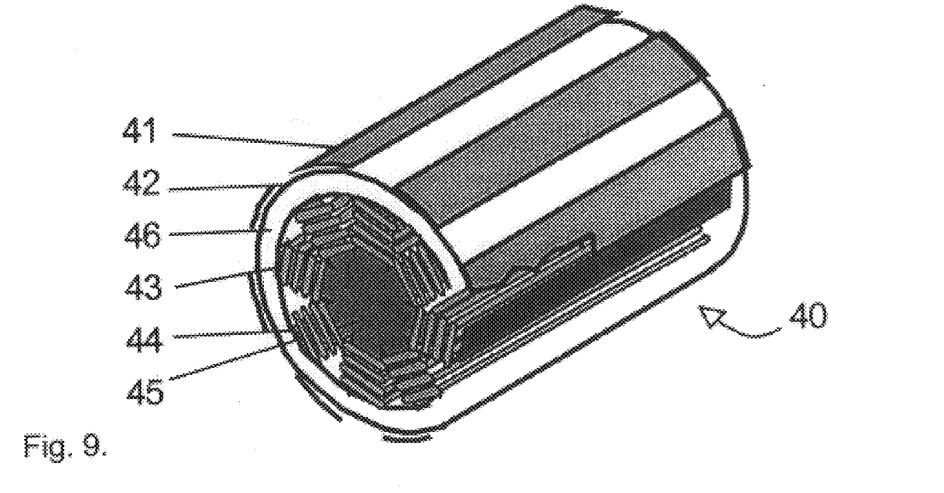
In FIG. 9, a confined direct current converter is shown.

In this category, the magnet system is enclosed in a torpedo-like hull. Advantage of this arrangement is it's compactness, which is favourable with respect to thermal insulation of the magnet coil. In FIG. 9, a multi-polar arrangement 40 is shown, the system however works in mono-polar form. In the enclosed arrangement, the converter comprises electrodes 41 attached to the outside of an outer cylinder 42. The cylinder axis is aligned with the flow direction. The cylinder 42 and electrodes 41 are electrically insulated by means of a sheet (not shown). Within outer cylinder 42 there is an inner cylinder 42 They are separated by an annular gap 46. Inside the inner cylinder 43, an iron magnet core 45 is present. The poles of the core 45 are enclosed by electrical coils 44 in which the magnetic field is generated. The inner cylinder and its interior is cooled to enable superconduction in the coils. The annular gap 46 between the inner cylinder 43 and outer cylinder 42 is evacuated to reduce thermal energy losses. Due to the interaction of the magnetic field and the fluid motion, an electric current starts to flow from one electrode 41 to another through electrical power leads (not shown). Together with the potential difference between the electrode, this current represents the electrical power generated.

2.4 Alternating Current (Induction) Systems

Rather than using a stationary magnetic field (actuated by permanent magnets or constant electrical currents) and separate application of electrode pairs to extract the electrical power, power can be converted by using the principle of self induction.

The induction principle (Faraday's Law) states that the voltage, generated in a conductor, due to a change in a magnetic field is proportional to the change rate of the magnetic field ($u = L \cdot d/dt(\Phi)$, where L is a constant and $\Phi$ is magnetic flux). If the magnetic field (in its turn) is generated by an electrical current in the conductor, the change rate of the magnetic field is linked to the change rate in that electrical current. Now, the principle of self induction states that the voltage u causes an electrical current in the conductor, which counteracts the change in the electrical current generating the magnetic field (Lenz Law). As a consequence, the sign of u is opposite to the direction of the current and the product of u and I represents a certain amount of electrical power. If the current i varies sinusoidally in time, the voltage u will vary in cosine form.

The previous hold for a vacuum ambient. If, in addition, the medium in which the coil is present is stationary with respect to the coil, the coil's current and voltage are in perfect counter-phase. In time-average sense, no electrical energy is generated nor consumed (the system merely stores electrical energy in the magnetic field).

However, when the medium, which is for instance sea water and thus electrically conductive, moves, electric currents are generated in the medium which themselves correspond with a magnetic field. This field (which moves in space) causes an electro motive force (e.m.k.) in the coil (in phase with the current), due to which the perfect counter-phase situation is lost, and hence electrical energy is produced (at the expense of kinetic energy of the moving medium), see FIG. 10.

The advantage of the induction type is that electrical power is induced in the magnet coils themselves, just like is done in a traditional asynchronous generator, and hence no additional electrodes are necessary.

Figure 10:
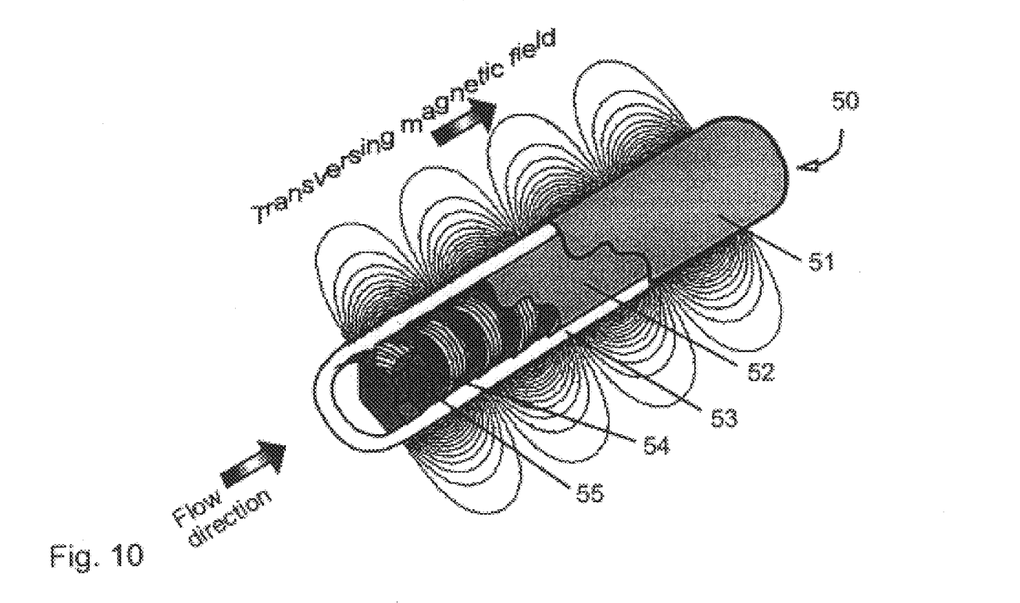
In FIG. 10, a free field, alternating current converter is shown.

In FIG. 10 an induction-type Tidal Current Converter 50 is shown in perspective view. The converter consists of multiple circular coils 54 placed along the axis of the converter. Each individual coil is provided with an electrical current which is off-phase with the electrical current of the neighbour coils. In this manner, a moving (traversing) magnetic field is produced. As an option, a magnet core structure 55 can be installed to enhance the resulting magnetic field. The entire coil/core structure is enclosed in a cylindrical vessel 52. This vessel may be isolated (for instance by means of a vacuum gap 53) from an outer cylindrical vessel 51 for thermal insulation purposes. In that case, the inner vessel may be cooled to obtain super conductivity.

3 Systems Using Kinetic Energy Augmentation

To reduce the amount of material and the parasitic heat losses (in case of cryogenic cooling of super conducting magnets), it is advantageous to increase the kinetic energy density (kinetic energy flux) of the tidal or ocean current before conversion.

Figure 11:
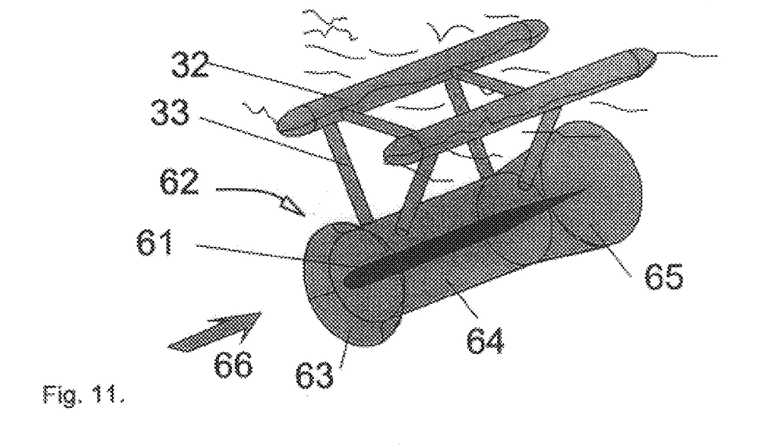
In FIG. 11, a diffuser system is shown.

Kinetic energy can be densified by means of a diffuser system, see FIG. 11. It consists of a duct 62 with a smooth inlet section 63, a throat section 64 enclosing the converter 61 and a diverging tail diffuser section 65. In use, the duct 62 extends in a direction substantially parallel to the water flow direction 66. As described by Bernoulli's law, the velocity of the water in the conversion section is increased, thereby increasing the kinetic energy flux. A structure of bars 33 attaches the entire system below the water surface level to floaters 32. This augmentation principle can be used in combination with MHD-converters according to FIGS. 4, 5, 7, 8, 9 and 10.

Figure 12:
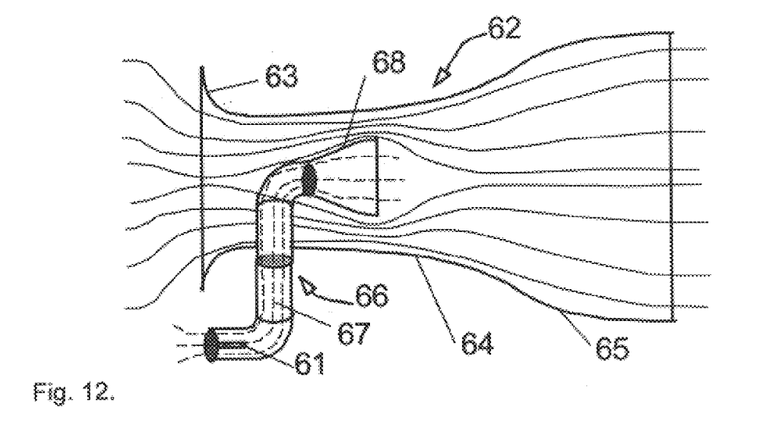
In FIG. 12, a venturi system is shown.

A variant to this augmentation principle which could be used to increase the kinetic energy flux is the venturi type, see FIG. 12. It basically consists of a type as shown in FIG. 11, but now an additional diffuser 66 is applied having a diverging section 68 in the narrowest cross sectional area of the duct 62. The additional diffuser 66 is provided with a draft tube 67 connected to the diverging section 68 and extending outside the duct 62 to such seawater. The converter 61 is placed in the draft tube 67.

Figure 13:
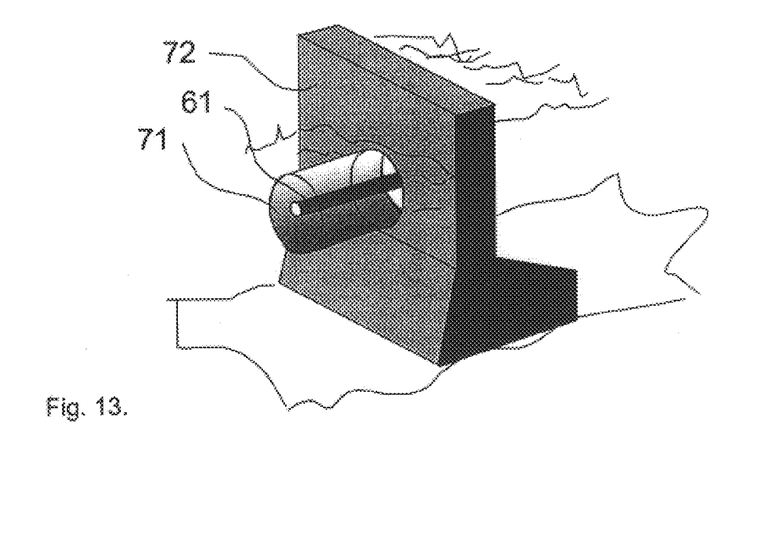
In FIG. 13, a barrage system is shown.

A classical way to increase the water velocity is to block a tidal current and release it through a small area in which, according to the invention, the converters may be placed, see FIG. 13. An MHD-converter 61 is placed in a discharge tube 71 which is part of the barrier 72. In this discharge tube section, the water velocity is high due to the hydraulic head created by the barrier.

Figure 14:
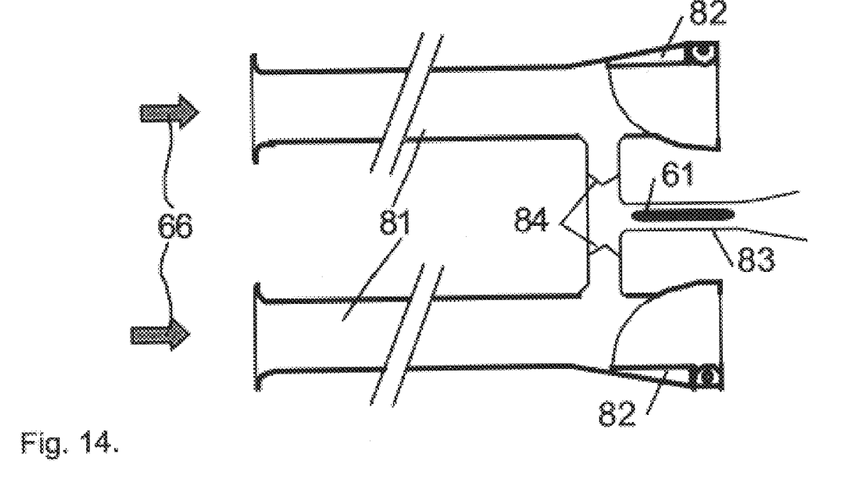
In FIG. 14, a hydraulic ram system is shown.
Figure 15:
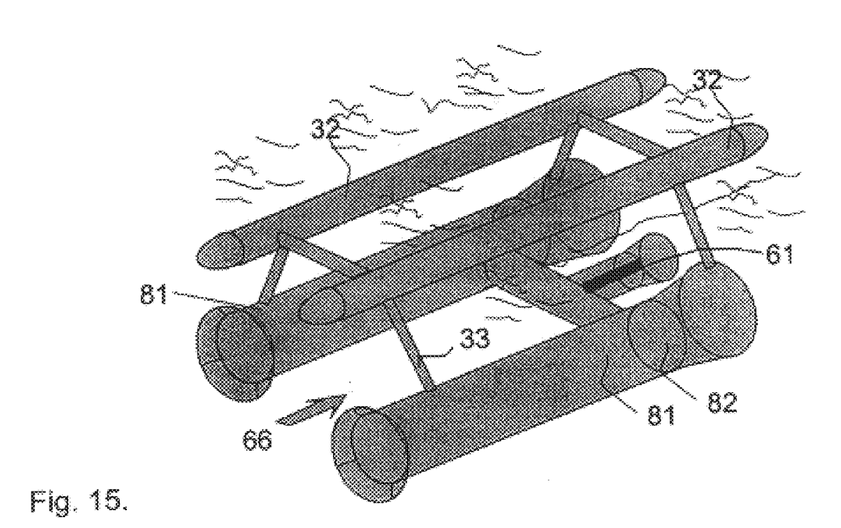
In FIG. 15, a hydraulic ram system is shown in perspective view.

A hydraulic ram type of kinetic energy densifyer is shown in FIG. 14. It consists of one or more main tubes 81 in which the tidal current 66 induces a flow of water. When a critical water velocity is reached, valves 82 suddenly close. The impulse of the water columns in the tubes now is released at high speed through a relatively small cross sectional area tube 83, enclosing the MHD converter 61. When the velocity in the main tubes 81 gets lower than a threshold value, the valves 82 re-open again and the process repeats. To flatten the pulse-wise discharge flow of a single ram-tube, two or more tubes can be placed parallel, hydraulically separated by one-way valves 84. In practice, the structure could have a 3D-appearance as shown in FIG. 15.

Figure 16:
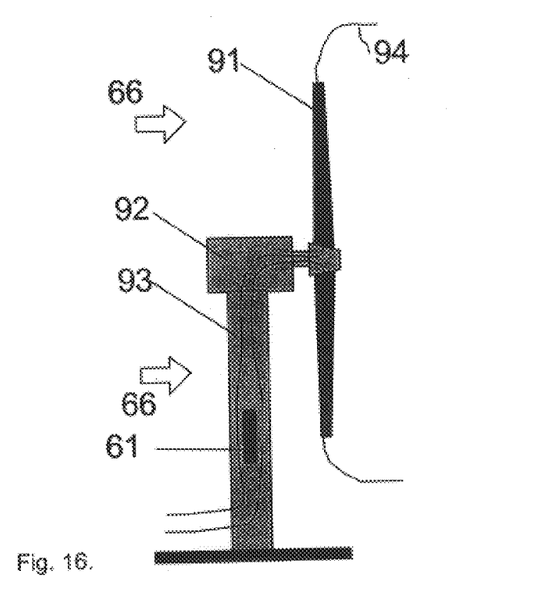
In FIG. 16, a Andrea-Enfield system is shown.

An MHD-converter may replace the air turbine in an Andreau Enfield wind-turbine, see figure P. This turbine utilises a fluid flow 94 which is set in motion by the centrifugal forces in the hollow rotor blades 91. In the submarine version, seawater is sucked through the rotor blades 91, a nacelle 92, a tower 93 and an MHD-convertor 61 mounted in the tower.

Figure 17:
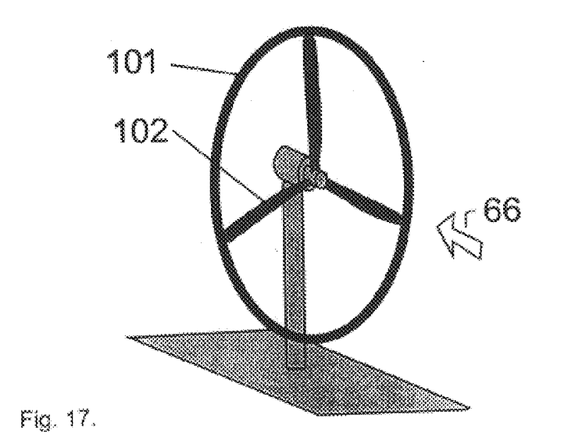
In FIG. 17, a turbine rotor-rim system is shown.

When the head and tail parts of the FIGS. 9 and 10 converter types are connected, endless (circular) converters can be build. The circular converters can be applied at the outer rim of a fast-running underwater turbine-rotor 102, see FIG. 17. For small blade angles (as experienced in modern, fast-running turbines) the peripheral velocity of the turbine blades is much greater (up to a factor 10) than the free steam velocity itself. As a result the relative velocity of the water with respect to a circular converter 101 is much greater than the free steam velocity too, thereby enhancing the efficiency and effectivity of the MHD-converter.

Densification of the kinetic energy flux also can take place by first concentrating the flux in vortices (Gabel, 1980). A converter could then extract the energy flux from the energetic vortices. These vortices can be unconfined (in free space, e.g. generated by a Delta-wing), see FIG. 18, or confined (created by a vortex chamber), see FIG. 19.

Figure 18:
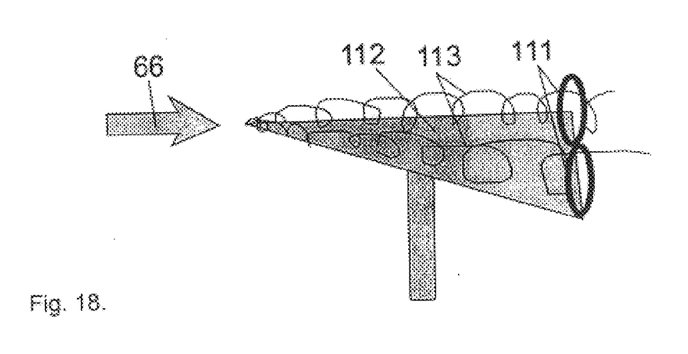
In FIG. 18, an unconfined vortex generator system is shown.

At both edges of the Delta wing 112, tip-vortices 113 are formed, which accumulate energy. At the far most downstream side of the wing, circular converters 111 are placed, converting the energy in the vortices to electrical power.

Figure 19:
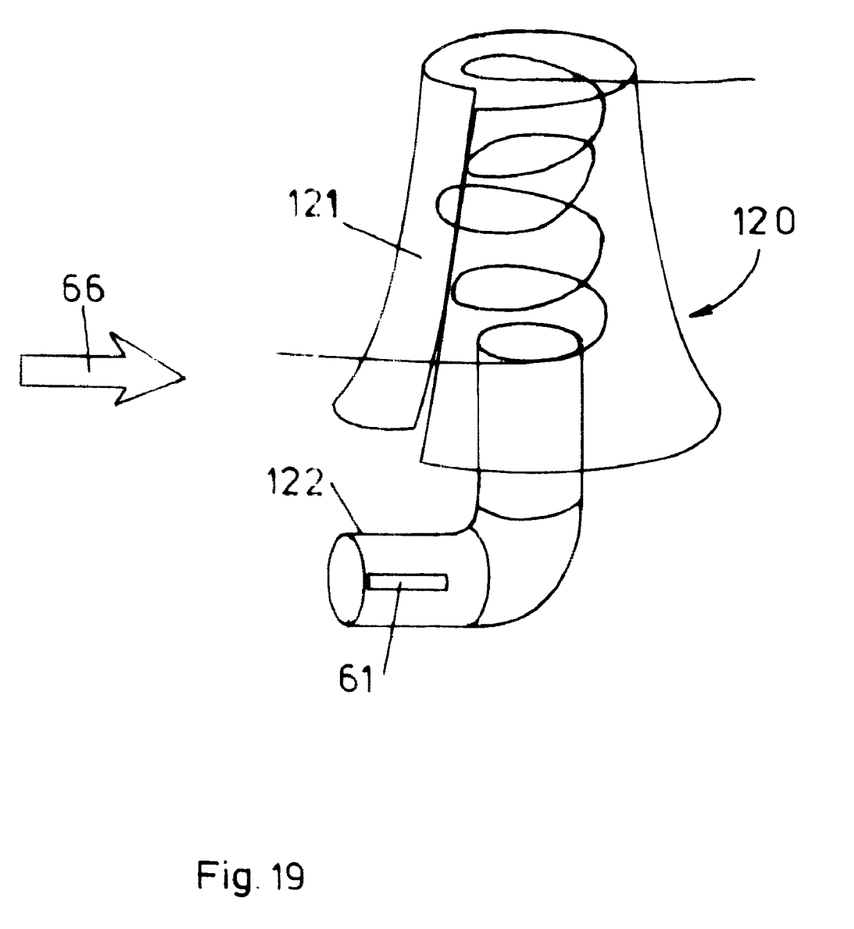
In FIG. 19, a confined vortex generator system is shown.

The confined vortex generator uses a chimney-like structure 120 with a vertical slit in a wall 121. Under action of the tidal current, a vortex (cyclone) is generated inside the chimney. Due to the low pressure in the centre of the cyclone, water is sucked through the feed pipe 122, enclosing the converter, to the interior of the chimney.

Reference List

Charlier, R. H, Tidal Energy, Van Nostrand Reinhold Company Inc. ISBN 0-442-24425-8, New York, 1982

Farady, Experimental Researches in Electricity, 1, 1839

Gabel, M, Energy, Earth and Everyone, Energy Strategies for spaceship Earth, Anchor Books, Anchor Press/Doubleday Garden City, N.Y., 1980

IT Power News, The world's first practical tidal current turbine, No. 10, February 1993.

Philips, O. M, The prospects for magnetohydrodynamic ship propulsion, Journal of Ship Research, March 1962, pp. 43–51

Way, S. Electromagnetic Propulsion for Cargo Submarines, Journal of Hydronautica, Vol. 2, number 2, pp. 49–57, April 1968.

What is claimed is:

1. A magneto hydrodynamic apparatus for generating electrical power comprising:

magnetic field generating means (12, 13; 22, 23; 31; 44; 54) for generating a magnetic field (B) within a flowing, conductive fluid, said magnetic field generating means having a construction enclosing a construction volume, said magnetic field (B), in use, extending at least partially outside said construction volume;

electrode means (11, 14, 24; 21, 24, 25; 41; 54) to provide electrical power caused by said flowing, conductive fluid in said magnetic field, wherein said magnetic field generating means are arranged to produce a substantial portion of the generated magnetic field outside said construction volume and said electrode means being arranged to convert energy from the conductive fluid flowing at an outside of the construction volume in combination with said portion of said magnetic field outside said construction volume into said electrical power.

2. A magneto hydrodynamic apparatus according to claim 1, wherein said magnetic field generating means comprises a plurality of bar magnets (12, 13) and said electrode means comprising bar electrodes (11, 14), said bar magnets and bar electrodes being cylindrically arranged in an alternating sequence.

3. A magneto hydrodynamic apparatus according to claim 1, wherein said magnetic field generating means comprises at least one coil (22; 44; 54) arranged to receive electrical current to produce said magnetic field.

4. A magneto hydrodynamic apparatus according to claim 3, wherein said coil (22) is arranged in a rectangular shape.

5. A magneto hydrodynamic apparatus according to claim 3, wherein said coil (22) is arranged in a serpentine shape.

6. A magneto hydrodynamic apparatus according to claim 3, wherein the apparatus comprises a cylinder (42) having an outside on which said electrode means (41) are attached, and an inside on which said at least one coil (44) is arranged.

7. A magneto hydrodynamic apparatus according to claim 3, wherein the apparatus comprises a magnetic core (45), the at least one coil comprising a plurality of coils (44) enclosing said magnetic core (45).

8. A magneto hydrodynamic apparatus according to claim 1, wherein the magnetic field generating means comprises a series of coils (54), each coil being provided with an electrical current which is off-phase with the electrical current in adjacent coils, the electrode means being formed by said series of coils to supply electrical power based on the principle of self-induction.

9. A magneto hydrodynamic apparatus according to claim 3, wherein the at least one coil is made of a material which is super conductive at a predetermined temperature.

10. A magneto hydrodynamic apparatus according to claim 1, wherein the apparatus is provided with kinetic energy augmentation means (62; 71, 72; 81, 82, 83; 91, 92, 93; 102; 112; 121, 122) to increase the kinetic energy of the flowing, conductive liquid.

11. A magneto hydrodynamic apparatus according to claim 10, wherein the kinetic augmentation means comprises a duct (62) provided with a smooth inlet section (63), a throat section (64) connected to said inlet section and accommodating said magnetic field generating means, and a diverging tail diffuser section (65) connected to said throat section (64).

12. A magneto hydrodynamic apparatus according to claim 11, wherein the kinetic augmentation means comprises an additional diffuser (66) with a diverging section (68) within the throat section and a draft tube (67) connected to said diverging section (68) and extending outside said duct (62) to suck conductive liquid, said draft tube (67) accommodating said magnetic field generating means.

13. A magneto hydrodynamic apparatus according to claim 10, wherein the kinetic augmentation means comprises a barrier (72) for blocking the flow of said fluid, a discharge tube (71) arranged in an opening in said barrier (72) and accommodating said magnetic field generating means.

14. A magneto hydrodynamic apparatus according to claim 10, wherein the kinetic augmentation means comprises at least one main tube (81), at least one diverging outlet section connected to said at least one main tube and comprising a valve which closes when the fluid velocity reaches a predetermined critical value, an outlet tube (83) with a relatively small cross sectional area connected to said at least one main tube (81) to outlet the fluid when said valve is closed, said outlet tube (83) accommodating said magnetic field generating means.

15. A magneto hydrodynamic apparatus according to claim 1 provided with floaters (32) able to float on said liquid.

16. A magneto hydrodynamic apparatus according to claim 10, wherein the kinetic augmentation means comprises a turbine with hollow rotor blades (91) which such fluid during rotation, said rotor blades (91) being connected to a nacelle (92) which is supported by a tower (93) which accommodates said magnetic field generating means.

17. A magneto hydrodynamic apparatus according to claim 10, wherein the kinetic augmentation means comprises a turbine with a plurality of rotor blades (102), the magnetic field generating means (101) extend along a circle supported by said rotor blades (102).

18. A magneto hydrodynamic apparatus according to claim 10, wherein the kinetic augmentation means comprises means (112; 120, 121, 122) for concentrating flux in vortices, the magnetic field generating means being arranged within said vortices.

19. Method of generating electrical power with a magneto hydrodynamic apparatus according to claim 1, comprising the step of arranging the apparatus in a conductive fluid like sea water flowing in a certain direction such that, during operation, the magnetic field generating means generates a magnetic field with at least a component perpendicular to said direction.

* * * * *